(12) United States Patent
Caso et al.

(10) Patent No.: US 6,236,687 B1
(45) Date of Patent: May 22, 2001

(54) DECISION DIRECTED PHASE LOCKED LOOP (DD-PLL) FOR USE WITH SHORT BLOCK CODES IN DIGITAL COMMUNICATION SYSTEMS

(75) Inventors: Gregory S. Caso, Hermosa Beach; David A. Wright, Solana Beach; Dominic P. Carrozza, Redondo Beach, all of CA (US)

(73) Assignee: TRW Inc., Redondo Beach, CA (US)

( * ) Notice: Subject to any disclaimer, the term of this patent is extended or adjusted under 35 U.S.C. 154(b) by 0 days.

(21) Appl. No.: 09/258,846

(22) Filed: Feb. 26, 1999

(51) Int. Cl.$^7$ .................................................. H03D 3/18
(52) U.S. Cl. .................... 375/327; 375/332; 375/333; 375/340; 375/376
(58) Field of Search ................... 375/324, 325, 375/327, 332, 333, 340, 294, 376; 329/307, 308

(56) References Cited

U.S. PATENT DOCUMENTS

| | | | |
|---|---|---|---|
| 4,513,429 | * | 4/1985 | Roeder ................................. 375/120 |
| 5,490,148 | * | 2/1996 | Carson ................................. 371/5.1 |
| 5,497,400 | * | 3/1996 | Carson et al. ........................ 375/324 |
| 5,764,102 | * | 6/1998 | Cochran et al. ...................... 329/304 |
| 6,115,431 | * | 9/2000 | Lee ...................................... 375/324 |

OTHER PUBLICATIONS

Telecommunication Systems Engineering, pp. 26–81, by Lindsey and Simon, published in 1973 by Pren Hall, Englewood Cliffs, New Jersey.
Digital Communications Satellite/Earth Station Enginerring, pp. 229–230, by Feher, published in 1997 by Noble Publishing Corp., Tucker Georgia.

\* cited by examiner

*Primary Examiner*—Stephen Chin
*Assistant Examiner*—Dac V. Ha
(74) *Attorney, Agent, or Firm*—Michael S. Yatsko

(57) ABSTRACT

An improved digital decision directed phase locked loop (DD-PLL) for use with short block codes using phase shifting keying (PSK) modulation. The improvement involves a conventional digital phase lock loop which is modified to base its loop corrections on the results obtained by decoding the short block code rather than on a symbol by symbol basis as is customary in conventional DD-PLLs. The improved method of loop corrections involves retaining the symbol data pending the decoder's decision, derotating the retained data in accordance with the decoded result, and integrating the derotated data to form a composite estimator upon which to base the loop correction. In its preferred embodiment, the invention uses an (8, 4) biorthogonal code with quatenary PSK.

32 Claims, 8 Drawing Sheets

DECISION DIRECTED PHASE LOCKED LOOP (DD-PLL) FOR USE WITH SHORT BLOCK CODES IN DIGITAL COMMUNICATION SYSTEMS

APPENDIX

An appendix containing a code listing of the control simulation program prepared in the QuickBasic programming language for providing a comparison of the performance of a basic decision directed phase locked loop (DD-PLL) for phase tracking of an input modulated signal based on a symbol by symbol basis and an improved decision directed phase locked loop (DD-PLL) for phase tracking of an input modulated signal based on a codeword by codeword basis according to the principles of the present invention. The appendix contains subject matter that is copyrighted. A limited license is granted to anyone who requires a copy of the program disclosed therein for purposes of understanding or analyzing the present invention, but no license is granted to make a copy for any other purposes.

BACKGROUND OF THE INVENTION

1. Technical Field

The present invention relates to a digital communication system and, more particularly, relates to an improved decision directed phase lock loop (DD-PLL) of a communication receiver for use with short block codes to reliably track phase of an input modulated signal for high performance at low signal-to-noise ratio.

2. Related Art

In communication systems, particularly digital communication systems comprising a communication transmitter for digital data transmission and a communication receiver for digital data reception via a channel, it is customary to impress intelligent information to be conveyed onto a carrier for transmission by one of many different modulation techniques, including binary phase shift keying modulation (BPSK) or quaternary phase shift keying modulation. When information is modulated onto a carrier by either a binary phase shift keying (BPSK) modulation or a quaternary phase shift keying (QPSK) modulation technique, and a BPSK or QPSK modulated signal is transmitted from the transmitter, the phase space of the receiver generally differs from that of the transmitter due to frequency difference between the local oscillators at the transmitter and receiver and the effect of varying delays and frequency shifts in the propagation path between the two sites.

To coherently demodulate the BPSK or QPSK modulated signal received from the transmitter, it is necessary for the receiver to form an estimate of the transmitter's phase so that the tumbling received signals may be transformed back into the fixed phase space of the transmitter. This process is known as "phase tracking." Conventionally, there are a number of phase tracking loops employing the phase locked principles such as squaring loops, Costas tracking loops, and decision-directed feedback loops for performing phase tracking of either a BPSK or QPSK modulated signal. A commonly used method for performing this type of phase tracking is a digital decision directed phase locked loop (DD-PLL). The basic principle of decision directed phase locked loops (DD-PLLs) is well known as described in the classic "Telecommunication Systems Engineering" text by William C. Lindsey and Marvin K. Simon, originally published by Prentice-Hall in 1973, and the "Digital Communications" text by Kamilo Feher, originally published by Prentice-Hall in 1983 and republished by Noble Publishing Corp. in 1997. Generally, the input to a digital decision directed phase locked loop (DD-PLL) is typically a sequence of complex data sample pairs obtained by down converting the incoming BPSK or QPSK modulated signal to a baseband quadrature (orthogonal) pair, passing these through matched filters and sampling the results at the symbol rate. This sampled pair may be considered as a complex variable in rectangular form. The complex variable is converted to polar form to produce the equivalent variable pair. The apparent incoming phase is referenced to the currently estimated phase (i.e. the tracked phase) to form the phase difference. The phase difference between the incoming phase and the estimated phase is influenced by the true difference between the phase systems of the transmitter and the receiver, by phase and thermal noise present at the receiver, and also by the symbol's data content which changes the angle by a multiple of $\pi/2$ for QPSK or of $\pi$ for BPSK. The polar form is then transformed back into the rectangular form, for subsequent processing, including soft decision decoding when error control is being utilized.

In contemporary phase tracking circuits, the effect of the data content on the phase difference between the incoming phase and the estimated phase is compensated by making a local decision on the data content of an individual symbol using a so-called "hard decision" on the rectangular coordinates. In the absence of noise in the baseband quadrature pair, the estimated phase decision, which is based on an individual symbol at the symbol rate, is usually correct so that the resultant phase error equals the true difference between the phase systems of the transmitter and the receiver. The value of the resultant phase error is then filtered to yield an updated estimate for use at the next symbol epoch, forming a classical servo loop. In practice, however, noise is always present so that the resultant phase error may be grossly distorted, especially when an incorrect decision is made in converting the phase difference between the incoming phase and the estimated phase to the resultant phase error. We have observed that, as long as the error rate is small, many existing symbol-by-symbol decision directed phase locked loops (DD-PLLs) perform well. However, at low signal-to-noise ratios, as we have discovered, the effect of incorrect decisions, together with the large amount of noise entering the loop, causes the tracking loop performance to degrade. The deviation of the tracked phase variable increases faster than the signal to noise ratio degrades. This consequence is particularly damaging for digital communication systems such as satellite communication systems that utilize large constellation signal sets to communicate at very low signal-to-noise ratios—as, for example, with error correcting codes.

Therefore, there remains a need for contemporary decision directed phase locked loops (DD-PLLs) to reduce deviation of phase tracking of either a binary phase shift keying (BPSK) or a quaternary phase shift keying (QPSK) modulated signal, and to minimize error rate for recovered data.

SUMMARY OF THE INVENTION

Accordingly, it is therefore an object of the present invention to provide a novel and improved decision directed phase locked loop (DD-PLL) for use in data communication systems.

It is also an object of the present invention to provide an improved decision directed phase locked loop (DD-PLL) for use in digital communication systems to enhance demodulation performance at low signal-to-noise (SN) ratio.

It is another object of the present invention to provide an improved decision directed phase locked loop (DD-PLL) for use in satellite communication systems to reduce deviation of phase tracking of an incoming modulated signal and lower error rate for recovered data.

It is further an object of the present invention to provide an improved decision directed phase locked loop (DD-PLL) for use with short block codes in satellite communication systems to track phase of a binary phase shift keying (BPSK) or a quaternary phase shift keying (QPSK) modulated signal using codeword level decisions rather than symbol by symbol decisions.

It is yet further an object of the present invention to provide an improved decision directed phase locked loop (DD-PLL) for use with short block biorthogonal codes (e.g., Reed-Muller codes) in satellite communication systems with minimal deviation of phase tracking and error rate for recovered data.

These and other objects of the present invention may be achieved by an improved decision directed phase locked loop (DD-PLL) for use with short block codes in a communication receiver of a digital communication system to track phase of an input modulated signal. The decision directed phase locked loop (DD-PLL) may comprise a first converter which converts a baseband quadrature pair of an input modulated signal encoded by a sequence of codewords from a rectangular form into a pair of polar coordinates having an incoming phase; a comparator which generates a phase difference of an incoming phase of an input modulated signal and an estimated phase; a second converter which converts the polar coordinates having a phase difference into a set of vector pairs of phase stabilized observables in a rectangular form; a decoder which decodes said set of vector pairs of phase stabilized observables in a rectangular form at a decode rate to generate decoded data; a vector error evaluator which evaluates a set of vector pairs of phase stabilized observables in accordance with decoded data at each codeword to generate a decision directed phase error estimate; and a loop filter which filters a decision directed phase error estimate to yield an update of an estimated phase at each codeword.

The vector error evaluator of the decision directed phase locked loop (DD-PLL) according to the present invention may include a buffer which retains a set of vector pairs of phase stabilized observables during each codeword; a derotator which translates each codeword from the decoded data into constituent dibits and derotates a set of vector pairs of phase stabilized observables corresponding to each dibit using a reverse angle for each dibit to yield derotated variables; an accumulator which accumulates the derotated variables for integration over a predetermined length of each codeword to yield integrated variables; and an arctangent unit which determines an arctangent of the integrated variables to yield a decision directed phase error estimate. The arctangent of the integrated variables may be determined by first obtaining an angle estimate from the integrated variables, next obtaining a mean value of the angle estimate, and then subtracting the mean value of the angle estimate from the angle estimate so as to yield the decision directed phase error estimate.

In accordance with another aspect of the present invention, an incoming phase of an input modulated signal may be accurately tracked using a decision directed phase locked loop (DD-PLL) by the steps of: receiving a baseband quadrature pair of an input modulated signal encoded by a sequence of biorthogonal codewords; translating the baseband quadrature pair of the input modulated signal from a rectangular form into a pair of polar coordinates having an incoming phase; generating a phase difference from the incoming phase of the modulated signal and an estimated phase; translating a pair of polar coordinates having the phase difference into a set of vector pairs of phase stabilized observables in a rectangular form; decoding a set of vector pairs of phase stabilized observables in a rectangular form at a decode rate to generate decoded data; evaluating a set of vector pairs of phase stabilized observables in accordance with decoded data at each codeword to generate a decision directed phase error estimate; and filtering the decision directed phase error estimate to yield an update of an estimated phase at every codeword. Each codeword can contain, for example, four data symbols, and the decode rate used for decoding a set of vector pairs of phase stabilized observables corresponds to one quarter of a symbol rate. A set of vector pairs of phase stabilized observables is evaluated by a series of substeps of: retaining a set of vector pairs of phase stabilized observables during each codeword; translating each codeword from the decoded data into constituent dibits and derotating a set of vector pairs of phase stabilized observables corresponding to each dibit using a reverse angle for each dibit to yield derotated variables; accumulating the derotated variables for integration over four symbols to yield integrated variables; and determining an arctangent of the integrated variables to yield a decision directed phase error estimate.

In accordance with yet another aspect of the present invention, a decision directed phase locked loop (DD-PLL) may be incorporated into a communication receiver of a digital communication system for receiving an input modulated signal corresponding to either a binary phase shift keying (BPSK) modulated signal or a quaternary phase shift keying (QPSK) modulated signal from a transmission channel to track an incoming phase. The communication receiver may include a down converter which down converts an input modulated signal into an intermediate frequency; a synchronous demodulator which separates an intermediate signal into a baseband quadrature pair; a matched filter and sampler which passes a sequence of complex sample pairs and samples the same at a symbol rate to produce a succession of baseband signal samples; a rectangular-to-polar converter which translates the baseband signal samples into polar coordinates having an incoming phase; a subtractor which generates a phase difference of the incoming phase of the input modulated signal and an estimated phase; a polar-to-rectangular converter which translates the polar coordinates having the phase difference into phase stabilized observables; a decoder which decodes the phase stabilized observables at a decode rate to generate decoded data; a vector error evaluator which evaluates the phase stabilized observables based on the decoded data at each codeword to generate a decision directed phase error estimate; and a digital filter which filters the decision directed phase error estimate to yield an update of an estimated phase at every codeword of, for example, four data symbols. The vector error evaluator may comprise a buffer which retains the phase stabilized observables during each codeword; a derotator which translates each decoded codeword from decoded data into constituent dibits and derotates the phase stabilized observables corresponding to each dibit using a reverse angle for each dibit to yield derotated variables; an accumulator which accumulates derotated variables for integration over four symbols to yield integrated variables; and an arctangent unit which determines an arctangent of the integrated variables to yield a decision directed phase error estimate at every codeword. Since the improved decision directed phase locked loop (DD-PLL) constructed according to the principles of the present invention operates to track phase of an input modulated signal using codeword level decision, rather than symbol by symbol decision, phase error may be minimized and demodulation performance at low signal-to-noise (SN) ratio may advantageously be enhanced.

The present invention is more specifically described in the following paragraphs by reference to the drawings attached only by way of example.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

Figure 1:
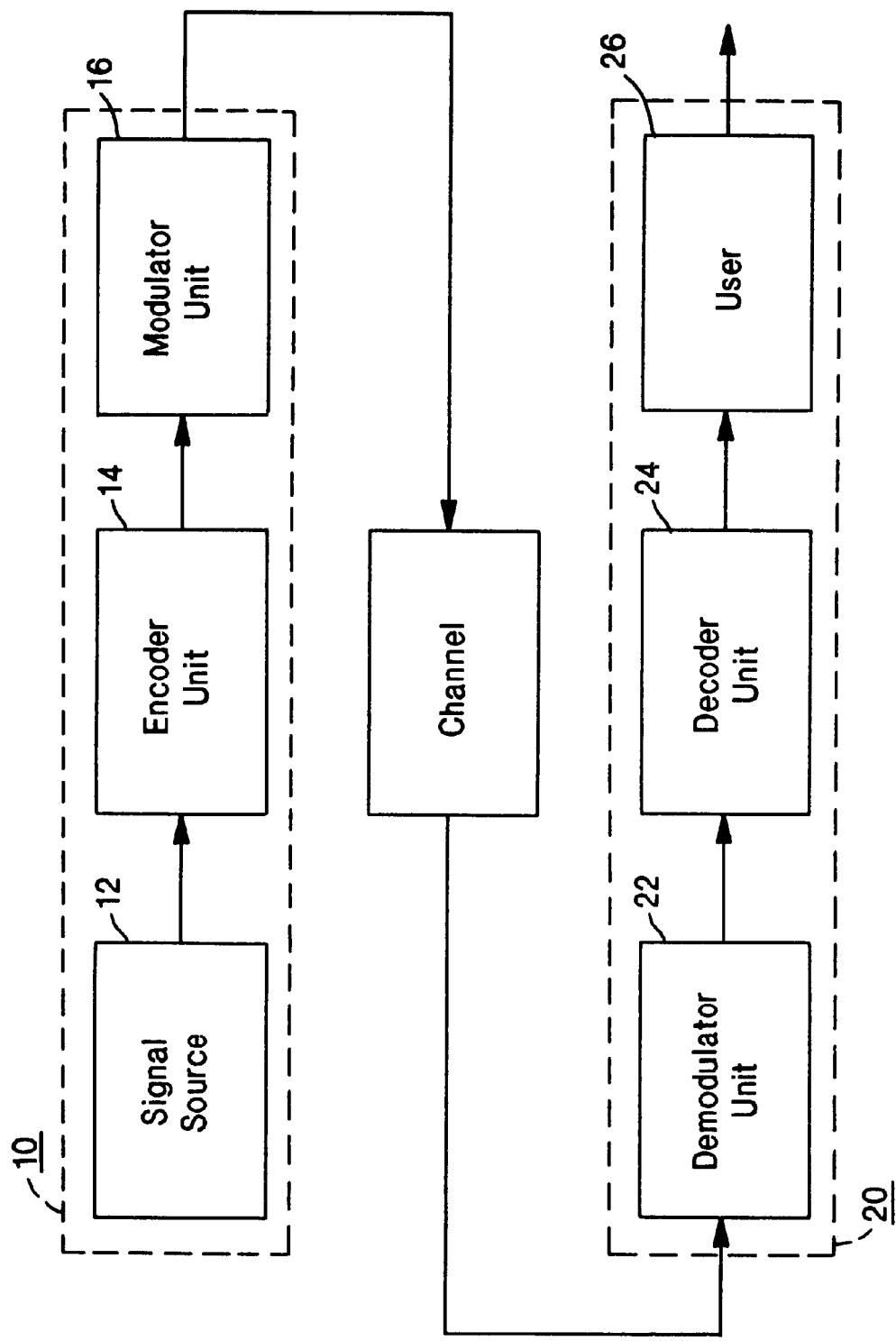
FIG. 1 illustrates an exemplary data communication system comprising a transmitter for digital data transmission and a receiver for digital data reception via a channel.

FIG. 1 of the drawings illustrates a model of an exemplary digital communication system for digital data communications. As shown in FIG. 1, the digital communication system comprises a transmitter 10 for digital data transmission and a receiver 20 for digital data reception via a transmission channel. The transmitter 10 includes an information source 12 for sending information or data in terms of samples, an encoder unit 14 for encoding data samples into data symbols comprised of binary digits (bits), and a modulator unit 16 for modulating the data symbols into a set of signals in accordance with a carrier using various digital modulation techniques such as either binary phase shifting keying (BPSK) or quaternary phase shift keying (QPSK) modulations for radio transmission via a channel. Data samples may be encoded by several available methods including the use of a generator matrix, the use of a feedback shift register with an equivalent generator polynominal, or the use of a look-up table.

The receiver 20 includes a demodulator unit 22 for receiving and demodulating an incoming binary phase shift keying (BPSK) or quaternary phase shift keying (QPSK) modulated signal as a sequence of binary digits, and a decoder unit 24 for decoding the binary digits from the demodulator unit 22 to recover data samples of original data for user 26.

When the BPSK or QPSK modulated signal is sent on a carrier from the transmitter 10, the phase space of the receiver 20 is generally different from that of the transmitter 10 due to frequency difference between the local oscillators at the transmitter 10 and receiver 20 and the effect of varying delays and frequency shifts in the propagation path between the two sites. To coherently demodulate the received signal at the receiver 20, the demodulator unit 22 commonly uses a decision directed phase locked loop (DD-PLL) for forming an estimate of the phase of the transmitter 10 so that the tumbling received signal may be transformed back into the fixed phase space of the transmitter 10.

Figure 2:
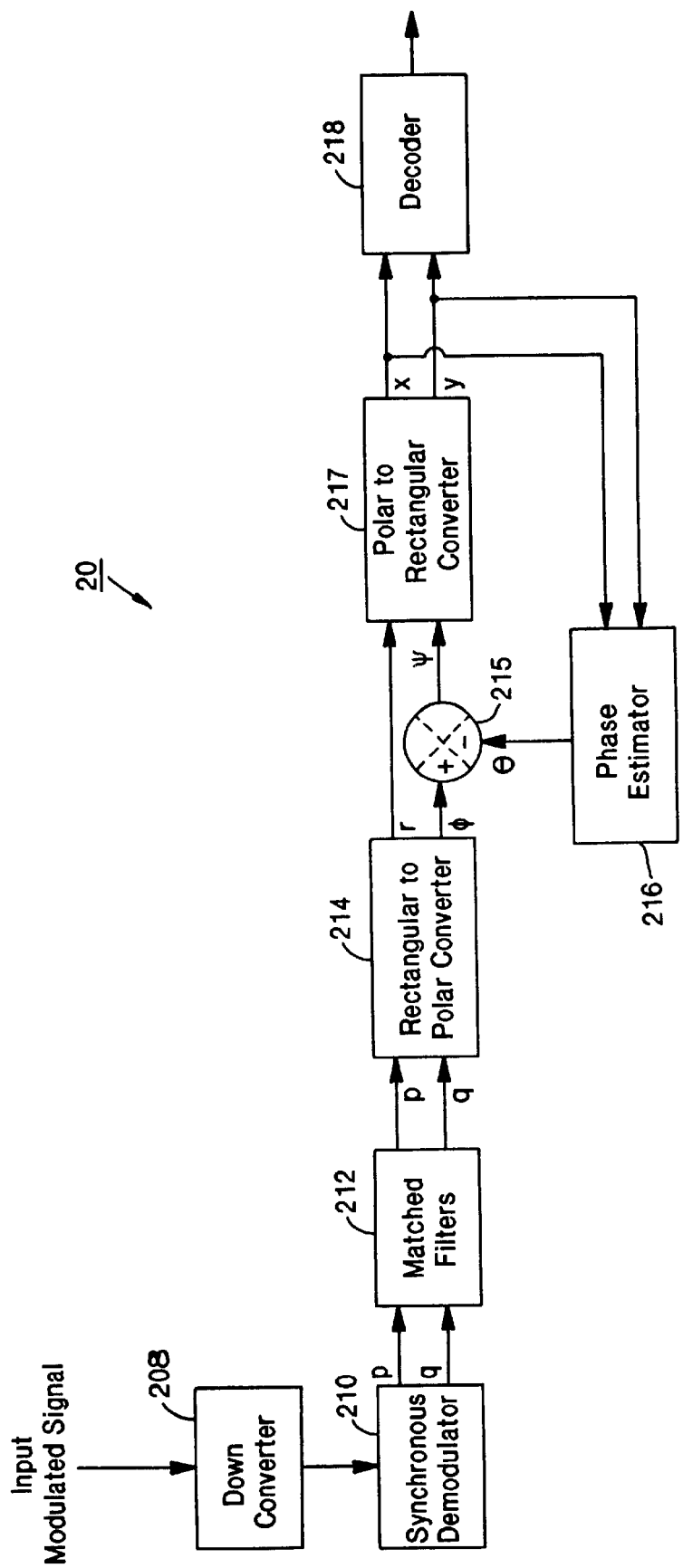
FIG. 2 illustrates a typical communication receiver using a basic decision directed phase locked loop (DD-PLL) for performing phase tracking of either a binary phase shift keying (BPSK) or quaternary phase shift keying (QPSK) modulated signal from the transmitter.

FIG. 2 illustrates a typical communication receiver 20 of a digital communication system using a basic decision directed phase locked loop (DD-PLL) for performing phase tracking of either a BPSK or QPSK modulated signal from the transmitter 10. As shown in FIG. 2, the communication receiver 20 includes a down-converter 208 for down converting an incoming BPSK or QPSK modulated signal into an intermediate frequency signal, a synchronous demodulator 210 for demodulating an intermediate frequency signal into a baseband quadrature pair (p(t), q(t)) and a matched filter & sampler 212 (or cross-correlators) for forming a sequence of complex sample pairs (p(j), q(j)) and sampling the results at the jth symbol epoch. Cross-correlators may preferably be used in lieu of matched filters 212 for forming the sequence of complex sample pairs (p(j), q(j)). This sample pair may be considered as a complex variable in rectangular form. A rectangular-to-polar converter 214 then receives the sampled output of the matched filters 212 for conversion into a polar form to produce an equivalent variable pair. The apparent incoming phase, $\phi(j)$, is referenced to the currently estimated phase (i.e., the tracked phase), $\theta(j)$, by a comparator 215 to yield a phase difference $\psi(j)=\phi(j)-\theta(j)$. The comparator 215 may be an adder or a subtractor for subtracting the estimated phase (i.e., the tracked phase) from the incoming phase to yield a phase difference. The estimated phase (i.e., the tracked phase) $\theta(j)$ is provided by a phase estimator 216 based on error estimates derived from the rectangular form, (x(j), y(j)) transformed from the polar coordinates (r(j), $\psi(j)$) by way of a polar-to-rectangular converter 219. Alternately, the tracked phase may be based on error estimates derived from the phase difference $\psi(j)$.

The value of the phase difference $\psi(j)$ between the incoming phase $\phi(j)$ and the currently estimated phase (i.e. the tracked phase) $\theta(j)$ is influenced by the true difference, $\epsilon(j)$, between the phase systems of the transmitter 10 and the receiver 20, by phase and thermal noise present at the receiver 20, and also by the symbol's data content which changes the angle by a multiple of $\pi/2$ for quaternary phase shift keying (QPSK) or of $\pi$ for binary phase shift keying (BPSK). The stabilized observation in polar coordinates of an input modulated signal is (r(j), ψ(j)) which is typically transformed back into the rectangular form, (x(j), y(j)) by a polar-to-rectangular converter 219 for subsequent processing, including soft decision decoding when error control is being utilized.

In basic decision directed phase locked loops (DD-PLLs), the effect of the data content on ψ(j) is compensated by making a local decision on the data content of the symbol using a so-called "hard decision" on (x(j), y(j)). Conceptually, the resultant bit or dibit decision is used to derotate (x(j), y(j)) to place the result in a reference half-plane or quadrant, (for BPSK or QPSK, respectively). For purposes of discussion, the input modulated signal as described by the invention is a quaternary phase shift keying (QPSK) modulated signal. However, a binary phase shift keying (BPSK) modulated signal is also intended with minor variations. In fact, the derotation is usually effected by changing ψ(j) in multiples of π/2 until such time as the resultant phase error, ε'(j), is in the range of −π/4 to +π/4, which is tantamount to forming the "hard decision" referred to above.

In the absence of noise in a sequence of complex sample pairs (p(j), q(j)), the decision is always correct so that the resultant error estimate, ε'(j), equals the true difference, ε(j), between the phase systems of the transmitter 10 and the receiver 20. The value of ε(j) is then filtered to yield an updated estimate θ(j+1) for use at the next symbol epoch, forming a classical servo loop. In all practical communication systems, however, noise is always present so that the resultant error estimate, ε'(j), may be grossly distorted, especially when the wrong decision is made in converting the phase difference between the incoming phase φ(j) and the currently estimated phase θ(j), (i.e. the tracked phase) ψ(j), to the resultant error estimate, ε'(j). So long as the error rate is small, these exemplary decision directed phase locked-loops (DD-PLLs) perform satisfactorily. However, at low signal to noise ratios, the effect of wrong or incorrect decisions further exacerbates the degradation of tracking loop performance resulting from the large amount of noise entering the phase locked loop (PLL), and causes the tracking loop performance to degrade. In fact, the variance of the recovered variable, θ(j), increases faster than the signal to noise ratio degrades. This consequence, as we have noted, is particularly damaging for communication systems that utilize large constellation signal sets to communicate at very low signal to noise ratios—as, for example, with error correcting block codes.

In the basic decision directed phase locked loops (DD-PLLs) as shown in FIG. 2, each decision is based on an individual symbol basis, on the tacit assumption that the data content is statistically independent from epoch to epoch. When coding is used, however, such an assumption is sub-optimum, since the data content of a set of symbols may be linked together over several epochs because of the redundancy present in the code. The subject improvement of the present invention specifically addresses the situation where a short block code is used, such as the (8,4) biorthogonal binary code (also known as a Reed-Muller code and by other aliases), and is recovered by a maximum likelihood decision based on a set of eight (8) soft decisions from four symbols, assuming that quaternary phase shift keying (QPSK) modulated signal is used. However, other specific block codes may also be used in lieu of the biorthogonal codes. In principle, any (n, k) block code may be used in lieu of the (8,4) biorthogonal code described herein as the preferred embodiment of the present invention. Examples may include the (12,8) extended hamming code and the (16,8) Norstrom-Robinson code. Codes with "k" larger than eight (8) are of reduced interest for many applications where the block code referred to in the present invention often forms the inner code in a concatenated code structure having a Reed Solomon code over GF (2^8) as the outer code. Also codes with large "n" are of reduced interest because, as subsequently described, the update rate of an improved decision directed phase locked loop (DD-PLL) of the present invention is once per codeword epoch (rather than once per symbol epoch of an exemplary decision directed phase locked loop), and this update rate may not be made very low since any frequency offset must be corrected.

Figure 3:
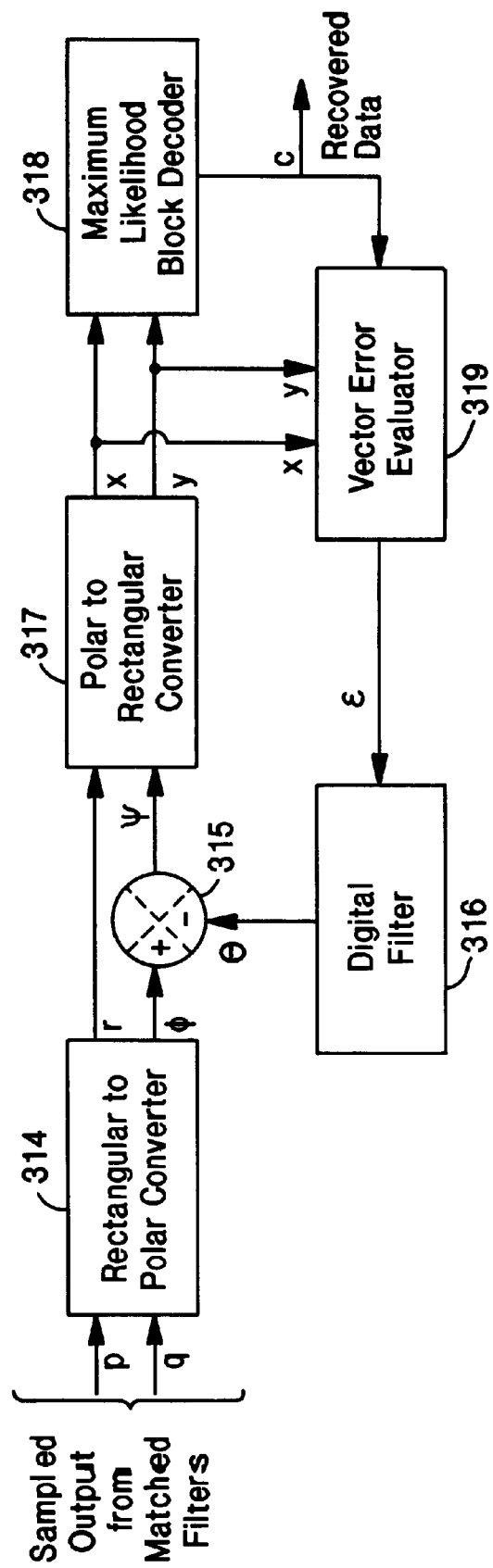
FIG. 3 illustrates an improved digital decision directed phase locked loop (DD-PLL) for use with short block codes as constructed according to the principles of the present invention.

Turning now to FIG. 3, this illustrates an improved digital decision directed phase locked loop (DD-PLL) for use with short block codes constructed according to the principles of the present invention. As shown in FIG. 3, the improved decision directed phase locked loop (DD-PLL) comprises a rectangular-to-polar converter 314, a comparator 315, digital filter 316, a polar-to-rectangular converter 317, a maximum likelihood block decoder 318, and a vector error evaluator 319. The rectangular-to-polar converter 314 is coupled to convert sampled complex variables (or equivalent pair of real variables) of an input modulated signal from the matched filter and sampler (i.e., cross-correlators) of a communication receiver 20, as shown in FIG. 2, from a rectangular form into an equivalent variable pair of polar coordinates (r(j), φ(j)). The comparator 315 is typically a subtractor used to subtract an incoming phase φ(j) of the input modulated signal from a currently estimated phase (i.e., the tracked phase) θ(j) for generating a phase difference ψ(j). The polar-to-rectangular converter 317 then converts the variable pair of polar coordinates (r(j), φ(j)) into a set of vector pairs of phase stabilized observables (x(j), y(j)) in a rectangular form. The maximum likelihood block decoder 318 is connected to the polar-to-rectangular converter 317 for decoding the set of vector pairs of phase stabilized observables (x(j), y(j)) in rectangular form at a decode rate to generate decoded data. The vector error evaluator 319 then evaluates a set of vector pairs of phase stabilized observables (x(j), y(j)) in accordance with the decoded data at each codeword to generate a decision directed phase error estimate ε(j) which is filtered by the digital filter 316 to yield an update of an estimated phase θ(j) at every codeword.

In the improved decision directed phase locked loop (DD-PLL) for use with short block codes as shown in FIG. 3, a series of observables are formed from four consecutive symbols {(x(j), y(j)): j=1,4} spanning the nth codeword epoch. A maximum likelihood decision, as to which of the sixteen (16) codewords in the (8,4) biorthogonal code was sent from the transmitter, is made by the maximum likelihood block decoder 318 based on this set of four (4) soft decision pairs or eight (8) scalar variables. During this decision making process, {(x(j), y(j)): j=1,4} are retained for subsequent formation of the resultant error estimate, ε'(n), as explained below. This error estimate ε'(n) is applied to the digital filter 316 to update an estimated phase, θ(n), similarly to the exemplary DD-PLL except that the improved DD-PLL is updated at one quarter the symbol rate—that is, in "n" epochs rather than "j" epochs. Here "n" is used to index a specific codeword within a serial stream of such codewords, whereas "j" is used to index a specific symbol within a serial stream of such symbols. Since there are four symbols for each codeword as described in the preferred embodiment of the present invention, an "n" epoch spans four "j" epochs. It is assumed that the frequency offset (or rate of phase change) is sufficiently small that the PLL does not need to be updated at the symbol epoch rate.

The essence of the present invention is the way that the resultant error estimate, ϵ'(n), is formed, which involves derotation of the set of soft decisions {(x(j), y(j)): j=1,4} to remove the effect of the data content. If an input modulated signal is a quaternary phase shift keying (QPSK) modulated signal as described in the preferred embodiment of the present invention, the effect of each dibit applied to the modulator at a symbol epoch is to rotate a reference phase by 0, 90, 180, or 270 degrees, as the dibit content is 00, 01, 11, 10 respectively.

In the improved decision directed phase locked loop (DD-PLL), the inferred rotations are derived from the decided upon codeword's bit pattern. The {(x(j), y(j)): j=1,4} rectangular symbol observables are then derotated using the reverse angle for each dibit to yield a new set of variables {(x'(j), y'(j)): j=1,4} which may be integrated over the four symbols. The derotation proceeds according to the following derotation rules:

| Dibits | x' | y' |
|--------|----|----|
| 00 | +x | +y |
| 01 | −y | +x |
| 11 | −x | −y |
| 10 | +y | −x |

After derotation, the four consecutive values of {(x'(j), y'(j)): j=1,4} are summed, vector wise, to yield a rectangular complex form (X, Y). This variable is converted to its equivalent argument (i.e. angle) through the arctangent function, and the difference between this value and the reference value (usually $+\pi/4$) provides the improved error estimate ϵ'(n). The resultant error estimate, ϵ'(n), is applied to the digital filter 316 which smooths a sequence of such errors to yield an update of the tracked phase estimate, θ(n), thereby completing the action of the improved DD-PLL according to the principles of the present invention.

Figure 4A:
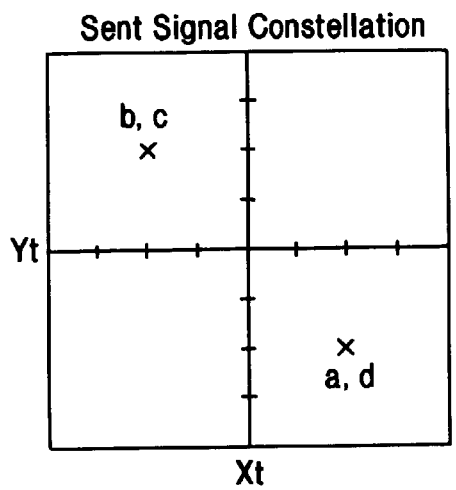
FIGS. 4A–4F illustrates signal-space diagrams of four dibits corresponding to a codeword for derotation according to the principles of the present invention.
Figure 4B:
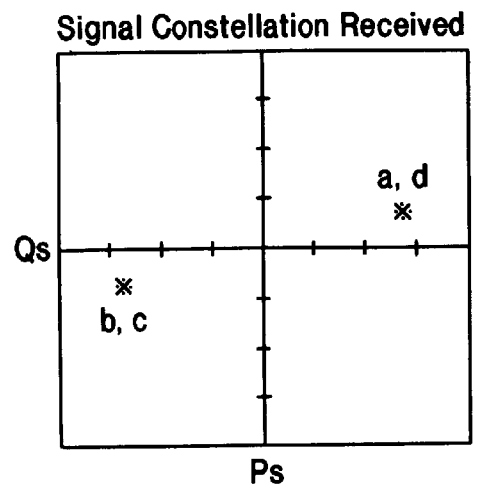
Figure 4C:
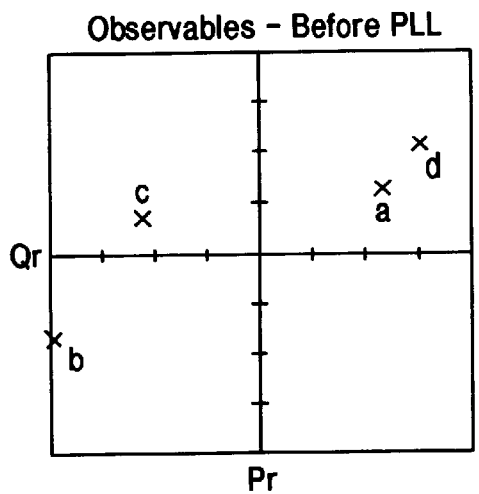
Figure 4D:
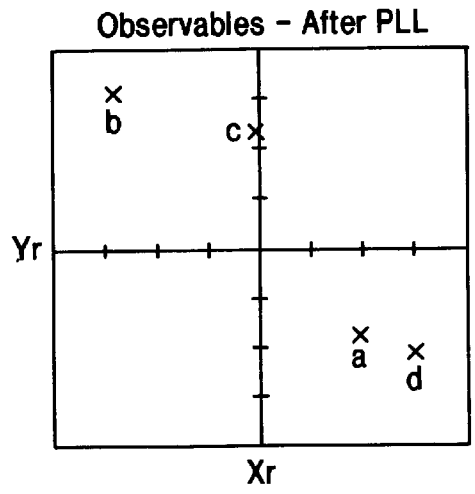

As an example for dibit derotation, FIGS. 4A–4F illustrate signal-space diagrams of the four dibits corresponding to a codeword during derotation. These four dibits are represented by symbols "a", "b", "c" and "d" in the figures. In general there are four distinct dibits with bipolar representations "++", "+−", "−−" or "−+", although only two distinct cases "+−" and "−+" occur in the present example. FIG. 4A illustrates the locations in phase space of the four dibits (symbols) of a "Sent Signal Constellation" from a transmitter site corresponding to the codeword of bipolar representations of, for example, "+−−+−++−." Xt and Yt represent the coordinates of the phase space of the sender. Here the dibit "+−" occurs at the first and fourth symbol epochs ("a" and "d") (fourth quadrant) and the dibit "−+" occurs at the second and third symbol epochs ("b" and "c") (second quadrant). Note that if the dibit may be represented as "++" then the symbols may fall in the first quadrant. Likewise, if the dibit may be represented as "−−" then the symbols may fall in the third quadrant. In the example shown in FIG. 4A, the dibits correspond to phase shifts of 90 and 270 degrees and the four corresponding symbols are labeled as a, d and b, c respectively in the drawings. When such a signal constellation is received at a receiver site, the constellation is rotated by some angle. For example, a shift of 60 degrees resulting in space coordinates Ps and Qs as shown in "Signal Constellation Received" of FIG. 4B. The actual observables are random variables as a result of additive noise (thermal noise), as shown at "Observables— Before PLL" in FIG. 4C. Note that the four symbols a, b, c, d are no longer overlapped as shown in FIGS. 4A and 4B, but are now individually distinguishable because of thermal noise. The improved decision directed phase locked loop (PLL) of the receiver site then rotates the observables to compensate for the channel phase shift as shown at "Observables—After PLL" in FIG. 4D. This rotation may not exactly restore the observations to the phase space of the sender due to tracking errors of the phase locked loop (PLL). In this example, the error is 10 degrees so that the rotation from phase space coordinates Pr and Qr of the "Observables—Before PLL" as shown in FIG. 4C to phase space coordinates Xr and Yr of the "Observables—After PLL" as shown in FIG. 4D is 70 degrees.

Figure 4E:
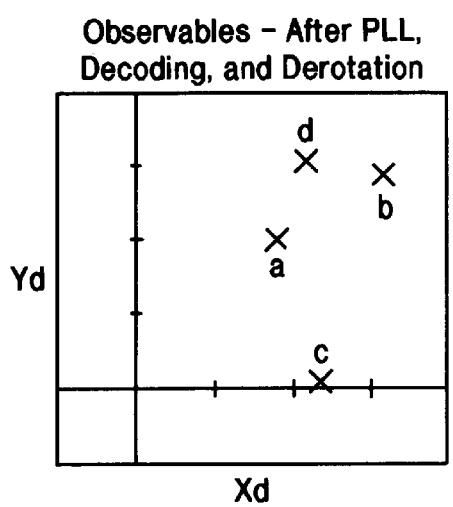
Figure 4F:
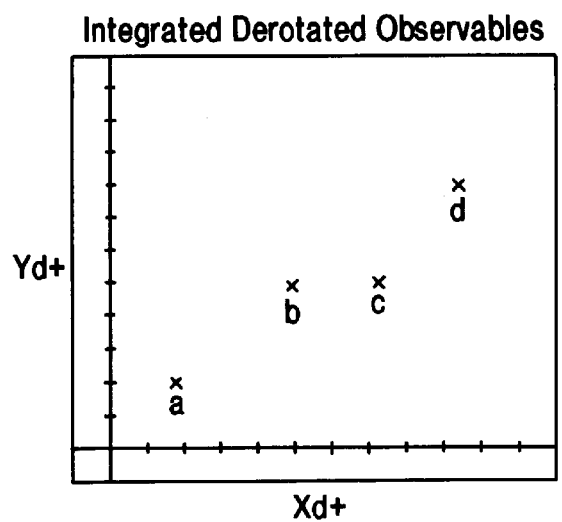
Figure 5:
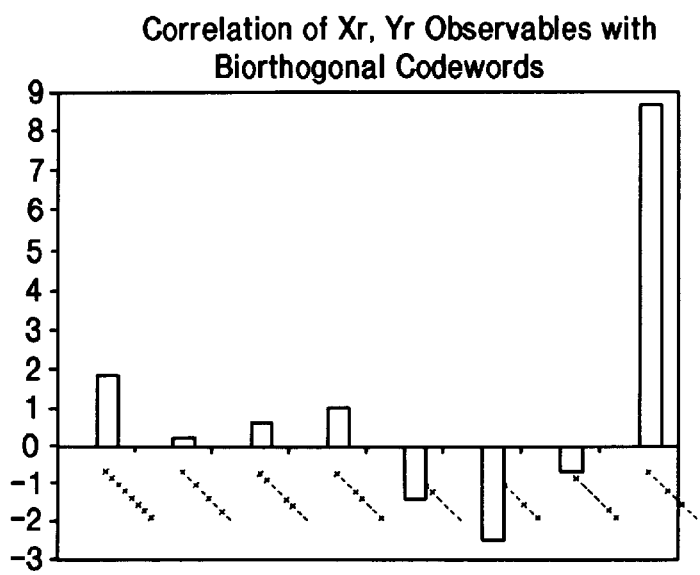
FIG. 5 illustrates correlations of phase space coordinate observables with biorthogonal codewords after a decision directed phase locked loop (DD-PLL) operation according to the principles of the present invention.

In spite of the noise and the phase error, the resultant Xr, Yr variables correlate best with the transmitted codeword as may be seen from FIG. 5 which illustrates the graphical representations of the "Correlation of Xr, Yr Observables With Biorthogonal Codewords." Thus these observables are derotated by +90 and −90 degrees along phase space coordinates Xd and Yd for the "a" and "d" and the "b" and "c" symbols, respectively, as shown at the "Observables—After PLL, Decoding, and Derotation" in FIG. 4E. The summation of the derotated variables along phase space coordinates Xd+ and Yd+ is shown at the "Integrated Derotated Observables" in FIG. 4F.

Numeric values for symbols "a," "b," "c," and "d" for each phase space coordinate pair of Xt and Yt as shown in FIG. 4A, Qs and Ps as shown in FIG. 4B, Qr and Pr as shown in FIG. 4C, Xr and Yr as shown in FIG. 4D, Xd and Yd as shown in FIG. 4E, and Xd+ and Yd+ as shown in FIG. 4F are provided as follows:

| Dibits Sym# | Xt | Yt | Qs | Ps | Qr | Pr | Xr | Yr | Xd | Yd | Xd+ | Yd+ |
|---|---|---|---|---|---|---|---|---|---|---|---|---|
| a | 1.000 | −1.000 | 1.366 | 0.366 | 1.165 | 0.631 | 0.992 | −0.879 | 0.879 | 0.992 | 0.879 | 0.992 |
| b | −1.000 | 1.000 | −1.366 | −0.366 | −1.953 | −0.816 | −1.435 | 1.556 | 1.556 | 1.435 | 2.436 | 2.427 |
| c | −1.000 | 1.000 | −1.366 | −0.366 | −1.119 | 0.362 | −0.043 | 1.176 | 1.176 | 0.043 | 3.611 | 2.470 |
| d | 1.000 | −1.000 | 1.366 | 0.366 | 1.513 | 1.074 | 1.526 | −1.054 | 1.054 | 1.526 | 4.666 | 3.996 |

FIG. 5 illustrates correlations of Xr and Yr Observables— After PLL as shown in FIG. 4D with biorthogonal codewords. Each (8,4) biorthogonal set may contain sixteen (16) codewords with each codeword having eight (8) components. Each biorthogonal set may be divided into 8 antipodal pairs so that only eight (8) correlations (positive or negative version of codeword) may be necessary to determine which of the codewords may be the best or most probable codeword observed by the maximum likelihood decision decoder 318. In other words, the most probable codeword sent is the one that correlates most strongly with the observations made by the maximum likelihood decision decoder 318. For example, if eight (8) of the sixteen (16) codewords (only positive version of codeword) may be correlated against the observations as seen in FIG. 4D, the resultant correlations may be provided as follows:

| Codeword | Correlations |
|----------|--------------|
| ++++++++ | 1.839 |
| +-+--+-+ | 0.242 |
| ++--++-- | 0.652 |
| +--++--+ | 1.063 |
| ++++---- | -1.370 |
| +-+--+-+ | -2.483 |
| ++----++ | -0.669 |
| +--+-++- | 8.662 |

The most probable codeword sent may be "+--+-++-" that has the highest correlation value of "8.662". As shown in FIG. 5, graphical representations of correlations of Xr and Yr Observables—After PLL of FIG. 4D with biorthogonal codewords are used for derotation by +90 and -90 degrees along phase space coordinates Xd and Yd for the "a" and "d" and the "b" and "c" symbols, respectively, as shown at the "Observable—After PLL, Decoding, and Derotation" in FIG. 4E.

Figure 6:
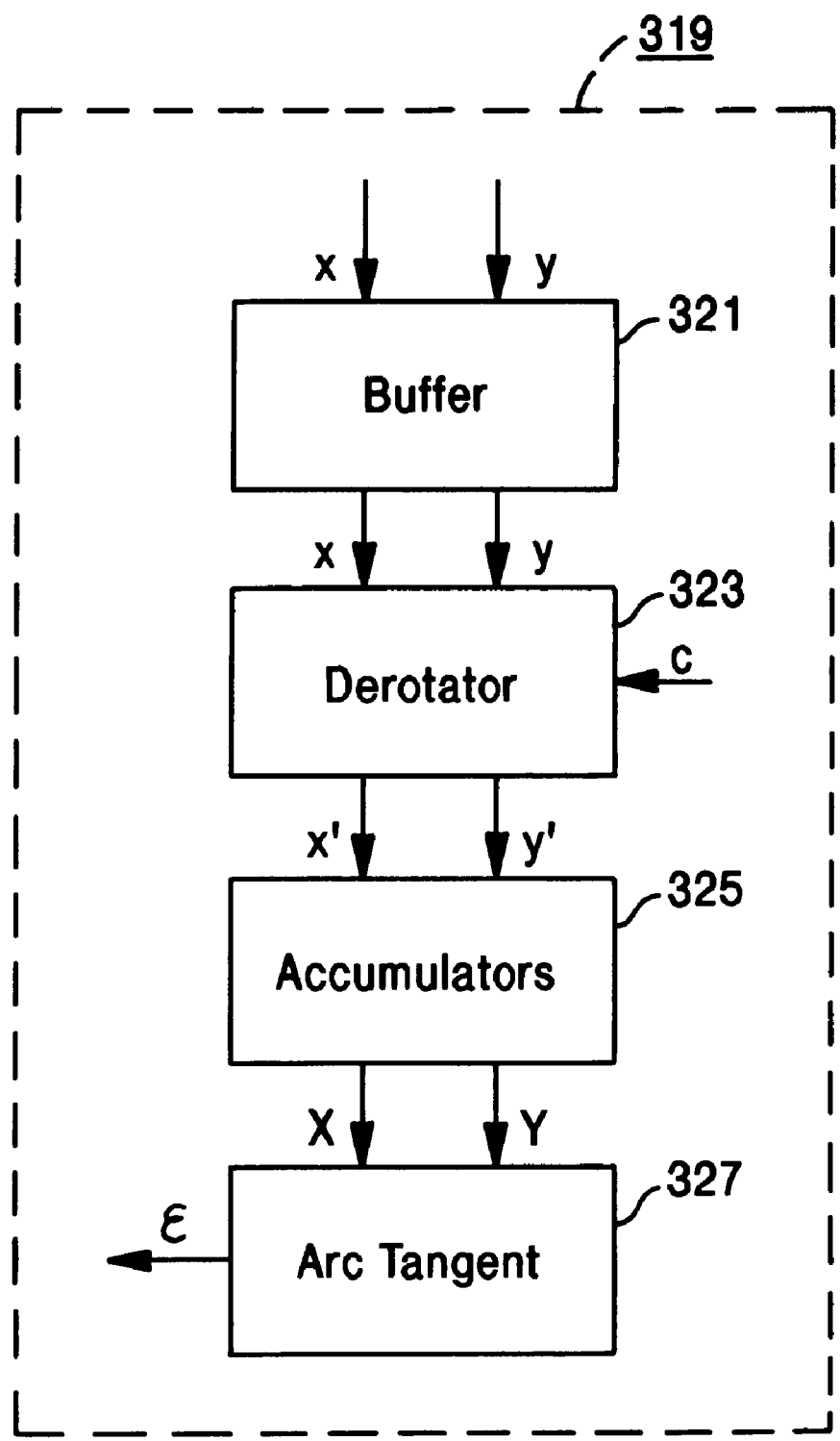
FIG. 6 illustrates a vector error evaluator of the digital decision directed phase locked loop (DD-PLL) as constructed according to the principles of the present invention.

Derotation of phase stabilized observables (x(j), y(j)) upon which the decoding was based, and the arctangent function of the integrated variables (X, Y) to yield the improved error estimate $\eta_o'(n)$ of the decision directed phase locked loop (DD-PLL) operations are performed by the vector error evaluator 319. In a preferred embodiment as shown in FIG. 6, the vector error evaluator 319 of the improved decision directed phase locked loop (DD-PLL) according to the present invention comprises a buffer 321, a derotator 323, accumulators 325, and arctangent unit 327. The buffer 321 retains a set of vector pairs of phase stabilized observables, (x(j), y(j)) until all symbols corresponding to each codeword are in place, and the codeword "c" corresponding to decoded information is decoded. When the codeword "c" is available, the derotator 323 breaks down the codeword "c" from the decoded data into constituent dibits which corresponds to the input quaternary phase shift keying (QPSK) symbols and derotates the phase stabilized observables, (x(j), y(k)) corresponding to each dibit using the reverse angle for each dibit according to the derotation rules as described above so as to yield derotated variables (x'(j), y'(j)). Each dibit in decoded codeword determines one of four rotations. The accumulators 325 integrate the derotated variables (x'(j), y'(j)) over four data symbols to yield common orientation and, as the derotated observables (x'(j), y'(j)) are formed, they are added to form the combined integrated observable vector (X, Y). The arctangent unit 327 then determines an arctangent of the integrated variables (X, Y) to yield a decision directed phase error estimate. The arctangent unit 327 first obtains an angle estimate from the integrated variables (X, Y), then obtains a mean value of the angle estimate which is 45 arcdeg, and subtracts the mean value of the angle estimate from the angle estimate to yield a decision directed phase error estimate $\epsilon'(n)$ of the incoming phase based on the four symbols which is passed to the digital filter 316 to yield an update of the tracked phase estimate, $\theta(n)$, as shown in FIG. 3.

Figure 7:
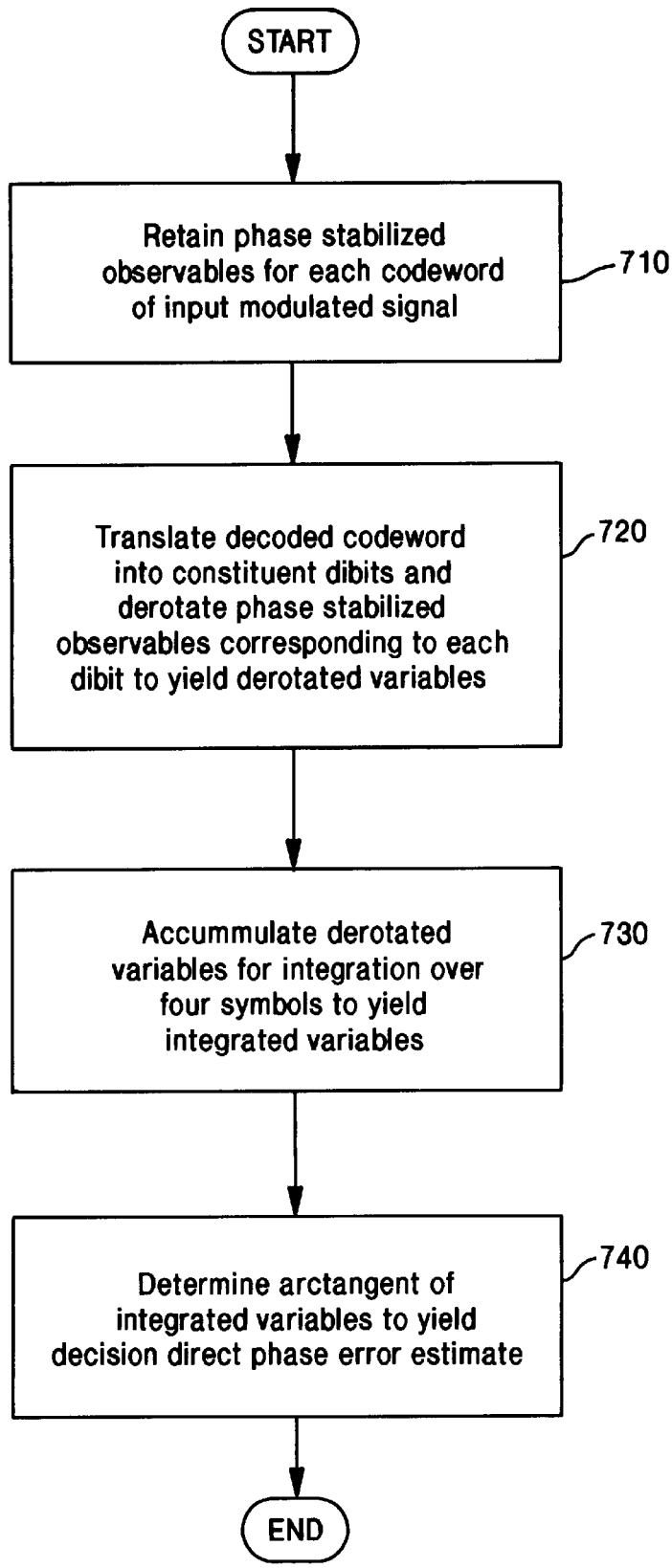
FIG. 7 is a flowchart of a decision directed phase locked loop (DD-PLL) operation according to the principles of the present invention.

Alternatively, the vector error evaluator 319 may also be configured with software and/or firmware to perform the derotation of phase stabilized observables (x(j), y(j)) upon which the decoding was based, and the arctangent function of the integrated variables (X, Y) to yield the improved error estimate $\epsilon'(n)$ of the decision directed phase locked loop (DD-PLL) operation. As shown in FIG. 7, the decision directed phase locked loop operation of the vector error evaluator 319 may be performed by retaining a set of vector pairs of phase stabilized observables (x(j), y(j)) of an input QPSK modulated signal, until all symbols corresponding to each codeword are in place at block 710; translating each decoded codeword from decoded data into constituent dibits and derotating a set of vector pairs of phase stabilized observables (x(j), y(j)) corresponding to each dibit using a reverse angle for each dibit to yield derotated variables (x'(j), y'(j)) at block 720; accumulating derotated variables for integration over four symbols to yield integrated variables (X, Y) at block 730; and determining an arctangent of the integrated variables to yield a decision directed phase error estimate $\epsilon'(n)$ of the incoming phase based on the four symbols at block 740.

To provide a fair comparison of the improved method with the per symbol DD-PLL, the improved DD-PLL loop must have a wider noise bandwidth than the basic DD-PLL loop to account for the fact that the improved DD-PLL loop operates with a longer epoch. With the biorthogonal code example which updates every four symbols versus the use of every symbol for the basic DD-PPL loop, a first order tracking loop should have a gain constant that is four times larger so that the loop's tracking error resulting from a frequency difference between the transmitter and the receiver is the same as for the basic DD-PLL loop. Nevertheless, the overall loop performance is better with the improved DD-PLL loop because of the much lower error rate for the (8,4) biorthogonal code decisions, as compared to the symbol by symbol decisions of the basic DD-PLL loop.

Figure 8:
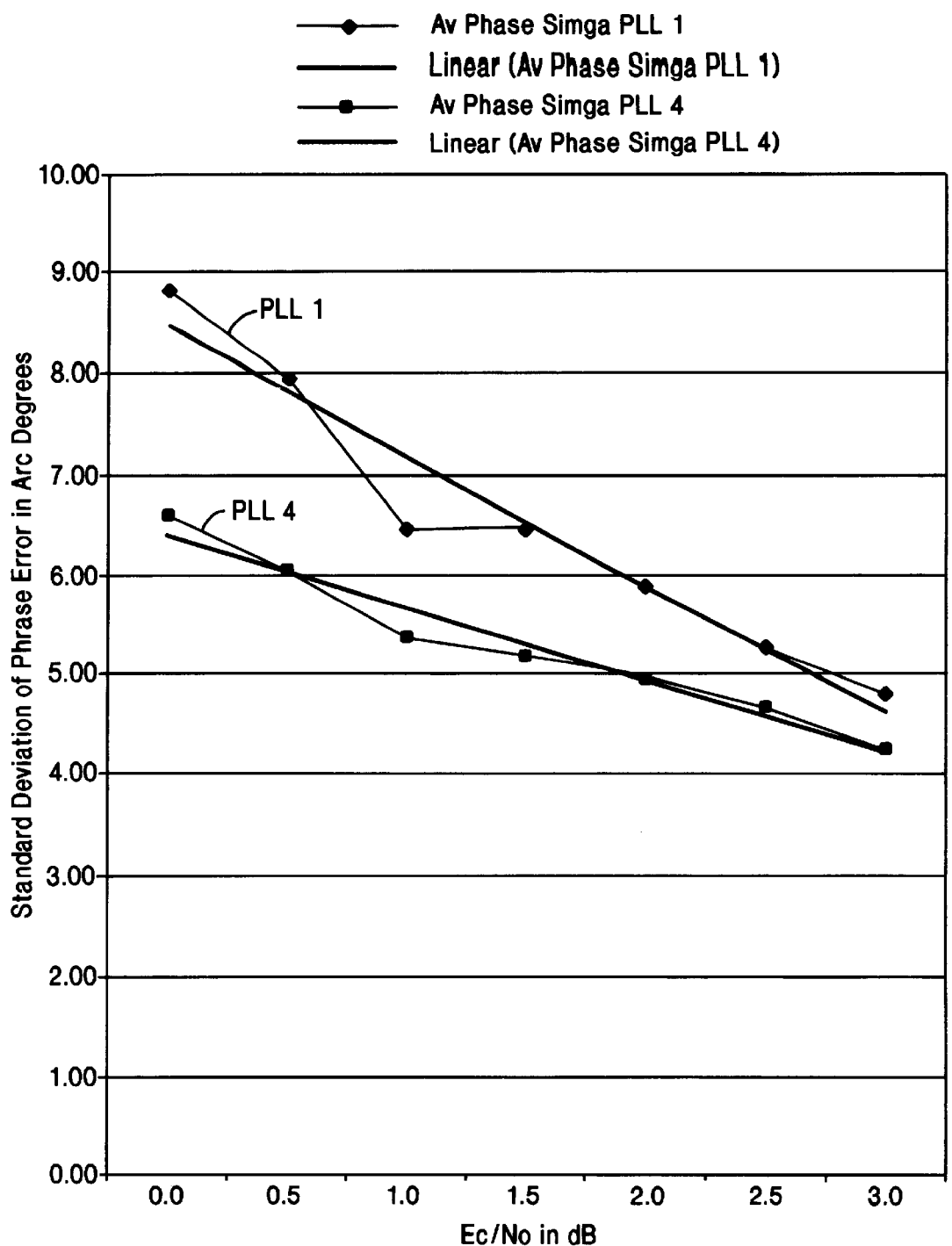
FIG. 8 illustrates a standard deviation of phase error in arc degrees vs chip-to-noise (Ec/No) density ratio (dB) of a basic decision directed phase locked loop (DD-PLL) for phase tracking of an input modulated signal based on a symbol by symbol basis and an improved decision directed phase locked loop (DD-PLL) for phase tracking of an input modulated signal based on a codeword by codeword basis according to the principles of the present invention.

FIG. 8 illustrates a standard deviation of phase error in arc degrees vs chip-to-noise (Ec/No) density ratio (dB) of a basic decision directed phase locked loop (DD-PLL) (Loop 1) for phase tracking of an input modulated signal based on a symbol by symbol basis and an improved decision directed phase locked loop (DD-PLL) (Loop 4) for phase tracking of an input modulated signal based on a codeword by codeword basis according to the principles of the present invention. Basically, two criteria for comparing the two loops (Loop 1) and (Loop 4) are (a) the standard deviation of the phase error at a given signal to raise ratio and (b) the signal-to-noise ratios required to yield a given standard deviation of phase error. These criteria may be assessed by simulations of the basic DD-PLL (Loop 1) and the improved DD-PLL (Loop 4). As shown in FIG. 8 for a chip energy to noise density ratio (Ec/No) of 1.5 dB, the standard deviation of phase error for the basic DD-PLL (Loop 1) is 6.47° or 25% greater than the 5.16° value observed for the improved DD-PLL (Loop 4). In addition, for 6° phase error (standard deviation) a signal-to-noise ratio of 1.8 dB is required for the basic DD-PLL (Loop 1) but only 0.5 dB is required for the improved DD-PLL (Loop 4) of the present invention.

A simulation model was developed to provide a comparison of the performance of a basic decision directed phase locked loop (DD-PLL) for phase tracking of an input modulated signal based on a symbol by symbol basis, and an improved decision directed phase locked loop (DD-PLL) for phase tracking of an input modulated signal based on a codeword by codeword basis according to the principles of the present invention, and this is shown in the attached appendix. The model assumed no frequency offset and a true phase error between the sender and the receiver of zero, so that the tracked phase $\theta$ is also the true error. This model produced random information nibbles (4 bits) which were encoded using the (8,4) biorthogonal code referred to above to create p and q transmitted components for four symbols.

The transmitted components had Gaussian noise added to them, with the effective chip energy to noise ratio Ec/No being 1.5 decibels (dB). The simulation provided two loops (Loop 1) and (Loop 4) which operate symbol by symbol and on the whole codeword, respectively, to model the basic DD-PLL (Loop 1) and the improved DD-PLL (Loop 4), respectively. Both loops have simple integrators for the loop filter (i.e., first order loops) with gains of 0.07 and 0.28, respectively. The decision directed loop error estimates were formed in the simulation using the methods described in this application. The simulation monitors the chip error rates, the decoded nibble error rate, and the true phase error. Except for being presented with common exogenous variables, Loop 1 and Loop 4 operate independently in the simulation. The simulation was exercised over a span of 5000 input nibbles, to produce 5000 codewords corresponding to 20000 symbols, and 40000 chips. The overall chip error rate with perfect tracking (i.e. before the DD-PLL model) was 4.8% Comparative results of the simulation are summarized below:

|  | (PLL) Loop 1 | (PLL) Loop 4 |  |
|---|---|---|---|
| Chip Error Rate | 5.3 | 5.1 | % |
| Nibble Error Rate | 0.80 | 0.54 | % |
| Phase Error (Std Dev) | 6.5 | 5.2 | arcdeg |

The simulation model was prepared using the QuickBasic programming language. Both the basic DD-PLL (Loop 1) and the improved DD-PLL (Loop 4) are used with QPSK transmission of (8,4) biorthogonal code vectors. Loop 1 provides tracking based on symbol by symbol decision direction. Effectively, this derotates the observation on a symbol by symbol basic. Loop 4 first decodes the (8,4) codeword, and then uses the result to derotate the four symbols constituents of the observation vector. A source listing of the simulation program is attached hereinbelow.

As described, the improved decision directed phase locked loop (DD-PLL) for use with short block codes including an (8,4) biorthogonal code according the principles of the present invention advantageously provides better phase tracking of either a binary phase shift keying (BPSK) modulated signal or a quaternary phase shift keying (QPSK) modulated signal using codeword level decisions rather than symbol by symbol decisions. Loop corrections are performed at decode rate, not symbol rate. As a result, better demodulator performance at low signal to noise ratio such as 1.5 bB is obtained with approximately a 25% reduction in phase tracking error.

While there have been illustrated and described what are considered to be preferred embodiments of the present invention, it will be understood by those skilled in the art that various changes and modifications may be made, and equivalents may be substituted for elements thereof without departing from the true scope of the present invention. For example, any (n, k) block code may be used in lieu of the (8, 4) biorthogonal code described herein as the preferred embodiment. Examples of these block codes may include the (12, 8) extended hamming code and the (16, 8) Nordstrom-Robinson code. Similarly, other modulation formats may be used in lieu of the binary phase shift keying (BPSK) or the quaternary phase shift keying (QPSK) modulation as described as the preferred embodiment of the present invention. Examples of other modulation formats may include octonary phase shift keying (OPSK). Larger block codes such as the (24, 12) extend Golay code using octonary phase shift keying (OPSK) may also be utilized for improved demodulation performance. If the (24, 12) extend Golay code using octonary phase shift keying (OPSK) may be used where each symbol may correspond to three chips with eight symbols corresponding to a codeword, the derotation step for OPSK may be more complex than the simple swap and complement procedure described for QPSK. However, the fundamental concept of using codeword level decisions rather than symbol by symbol decision for phase tracking may be identical. Further, many modifications may be made to adapt a particular situation to the teachings of the present invention without departing from the central scope thereof. Therefore, it is intended that the present invention not be limited to the particular embodiment disclosed as the best mode contemplated for carrying out the present invention, but that the present invention includes all embodiments falling within the scope of the appended claims.

APPENDIX

Each line of the code listing in the Appendix contains the control simulation information for providing a comparison of the performance of the basic decision directed phase locked loop (DD-PLL) for phase tracking of an input QPSK modulated signal based on a symbol by symbol basis and the improved decision directed phase locked loop (DD-PLL) for phase tracking of an input QPSK modulated signal based on (8, 4) biorthogonal code vector according to the principles of the present invention.

```
DEFINT A-Z: RANDOMIZE TIMER
SCREEN 12: CLS
pi! = 4 * ATN(1)
EcNo! = 3!
dev! = 1 / SQR(2 * (10 ^ (EcNo! / 10)))
k1! = .071                              ' Gain for loop1
k2! = 4 * k1!                           'and 4.
' Generate a Hadamard matrix - used bipolar to generate the (8, 4) code
DATA +1, +1, +1, +1, +1, +1, +1, +1
DATA +1, +1, +1, +1, -1, -1, -1, -1
DATA +1, +1, -1, -1, +1, +1, -1, -1
DATA +1, +1, -1, -1, -1, -1, +1, +1
DATA +1, -1, +1, -1, +1, -1, +1, -1
DATA +1, -1, +1, -1, -1, +1, -1, +1
DATA +1, -1, -1, +1, +1, -1, -1, +1
DATA +1, -1, -1, +1, -1, +1, +1, -1
DIM cp(1 TO 8, 1 TO 4), cq(1 TO 8, 1 TO 4)
FOR i = 1 TO 8
    FOR j = 1 TO 4
        READ cp(i, j)   'Save (p,q) signal coords for each vector i
        READ cq(i, j)   ' and each symbol epoch j (for + sign case)
    NEXT j
NEXT i
DIM h1(-100 TO 100), h4(-200 TO 200)  'Phase tracking error
                                                histograms
Solo:                         'Do a four symbol (one codeword) pass
' Begin with the received four symbol sequence
it = 1 + INT(8 * RND)         'Select Walsh function
st = SGN(RND - .5)            ' and sign for transmitted codeword
FOR j = 1 TO 4                          'Produce the received symbols
    sx(j) = st * cp(it, j)                  'Signal coords,
    sy(j) = st * cq(it, j)                  ' including sign
    rad! = dev! * SQR(-2 * LOG(RND))    'Generate 2-d normal in polar
    arg! = 2 * pi! * RND                    ' for noise
    p!(j) = sx(j) + rad! * COS(arg!)        'Rectangular observables
    q!(j) = sy(j) + rad! * SIN(arg!)
    r!(j) = SQR(p!(j) ^ 2 + q!(j) ^ 2)              'Polar observables (r, phi)
    phi!(j) = ATN(q!(j) / p!(j))
    IF p!(j) < 0 THEN
        phi!(j) = phi!(j) + pi! * SGN(q!(j))    'Fix QB ATN ambiguity
    END IF
    IF SGN(p!(j)) <> sx(j) THEN ne0 = ne0 + 1   'Count entry errors
    IF SGN(q!(j)) <> sy(j) THEN ne0 = ne0 + 1
NEXT j
' Apply phase correction for the Loop 1 process
the1!(0) = the1!(4)           'Carry over phase from last pass
FOR j = 1 TO 4
```

APPENDIX-continued

Each line of the code listing in the Appendix contains the control simulation information for providing a comparison of the performance of the basic decision directed phase locked loop (DD-PLL) for phase tracking of an input QPSK modulated signal based on a symbol by symbol basis and the improved decision directed phase locked loop (DD-PLL) for phase tracking of an input QPSK modulated signal based on (8, 4) biorthogonal code vector according to the principles of the present invention.

```
    psi1!(j) = phi!(j) - the1!(j - 1)    'Corrected phase = input - track
    IF ABS(psi1!(j)) > pi! THEN         'Keep in range -pi to +pi
        psi1!(j) = psi1!(j) - 2 * pi! * SGN(psi1!(j))
    END IF
    x1!(j) = r!(j) * COS(psi1!(j))      'Corrected rectangular observables
    y1!(j) = r!(j) * SIN(psi1!(j))      ' with loop 1
    IF SGN(x1!(j)) <> sx(j) THEN ne1 = ne1 + 1    'Count post
                                                   DDPLL1 errors
    IF SGN(y1!(j)) <> sy(j) THEN ne1 = ne1 + 1
    IF x1!(j) > 0 THEN                  'Decision directed loop error
        eps1!(j) = psi1!(j) - SGN(y1!(j)) * pi! / 4    'Quadrants 1 and 4
    ELSE
        eps1!(j) = psi1!(j) - SGN(y1!(j)) * 3 * pi! / 4  'Quadrants 2 and 3
    END IF
    the1!(j) = the1!(j - 1) + k1! * eps1!(j)    'Simple first order loop
    IF ABS(the1!(j)) > pi! THEN         'Keep theta in range
        the1!(j) = the1!(j) - 2 * pi! * SGN(the1!(j))   ' -pi to +pi
    END IF
NEXT j
t1 = 400 * the1!(4) / pi!               'Form histogram of phase error
h1(t1) = h1(t1) + 1                     '+ - 100 bins for + - 45 arcdeg
' Optimum decision process for biorthogonal signal set - Case 1
FOR i = 1 TO 8          'Form v(i) = r dot c(i) for half of the codewords
    v! = 0
    FOR j = 1 TO 4
        v! = v! + x1!(j) * cp(i, j) + y1!(j) * cq(i, j)
    NEXT j
    v!(i) = v!
NEXT i
vi! = v!(1): ir1 = 1    'Find largest absval of v(i) = r(i) dot c
FOR i = 2 TO 8
    IF ABS(v!(i)) > ABS(vi!) THEN
        vi! = v!(i)
        ir1 = i
    END IF
NEXT i
IF SGN(vi!) < 0 THEN sr1 = -1 ELSE sr1 = 1  'If neg result closest
                                             ' codeword is the antitwin
IF ((sr1 <> st) OR (ir1 <> it)) THEN nc1 = nc1 + 1  'Tally codeword
                                                     errors
                                                    ' for Loop 1
' Apply phase correction for the Loop 4 case
FOR j = 1 TO 4
    psi4!(j) = phi!(j) - the4!        'Corrected phase is psi
    IF ABS(psi4!(j)) > pi! THEN       Theta4 is fixed for 4 epochs
        psi4!(j) = psi4!(j) - 2 * pi! * SCN(psi4!(j))
    END IF
    x4!(j) = r!(j) * COS(psi4!(j))    'Corrected rectangular observables
    y4!(j) = r!(j) * SIN(psi4!(j))    ' for Loop 4
    IF SGN(x4'(j)) <> sx(j) THEN ne2 = ne2 + 1    'Bit error tally -
                                                   loop 4
    IF SGN(y4'(j)) <> sy(j) THEN ne2 = ne2 + 1
NEXT j
    ' Optimum decision process for biorthogonal signal set - Case 4
FOR i = 1 TO 8          'Form v(i) = r dot c(i) for half of the codewords
    v! = 0
    FOR j = 1 TO 4
        v! = v! + x4!(j) * cp(i, j) + y4!(j) * cq(i, j)
    NEXT j
    v!(i) = v!
NEXT i
vi! = v!(1): ir4 = 1    'Find largest absval of v(i) = r(i) dot c
FOR i = 2 TO 8
    IF ABS(v!(i)) > ABS(vi!) THEN
        vi! = v!(i)
        ir4 = i
    END IF
NEXT i
IF SGN(vi!) < 0 THEN sr4 = -1 ELSE sr4 = 1  'If neg result closest
                                             codeword
```

APPENDIX-continued

Each line of the code listing in the Appendix contains the control simulation information for providing a comparison of the performance of the basic decision directed phase locked loop (DD-PLL) for phase tracking of an input QPSK modulated signal based on a symbol by symbol basis and the improved decision directed phase locked loop (DD-PLL) for phase tracking of an input QPSK modulated signal based on (8, 4) biorthogonal code vector according to the principles of the present invention.

```
                                                 ' is the antitwin
' Derotate the four x,y pairs
xx! = 0: yy! = 0                        'Clear vector sum variables
FOR j = 1 TO 4
    IF cp(ir4, j) = 1 THEN
        IF cq(ir4, j) = 1 THEN '1st quad - no twist
            x! = x4!(j)
            y! = y4!(j)
        ELSE
            x! = -y4!(j)              '4th quad - quarter turn anticlockwise
            y! = x4!(j)
        END IF
    ELSE
        IF cq(ir4, j) = 1 THEN '2nd quad - ninety arcdeg clockwise
            x! = y4!(j)
            y! = -x4!(j)
        ELSE
            x! = -x4!(j)              '3rd quad - about face
            y! = -y4!(j)
        END IF
    END IF
    xx! = xx! + sr4 * x!              'Form vector sum of four derotated
    yy! = yy! + sr4 * y!              ' obervables, accounting for antipodal
                                      ' effect
NEXT j
eps4! = ATN(yy! / xx!)                             'Loop 4 decision directed
IF xx! < 0 THEN eps4! = SGN(yy!) * pi! + eps4! ' phase error
eps4! = eps4! - pi! / 4
the4! = the4! + k2! * eps4!       'First order loop action for Loop 4
t4 = 400 * the4! / pi!            'Histogram as for Loop 1
h4(t4) = h4(t4) + 1
nt = nt + 8                       'Count total channel bits
IF ((sr4 = st) AND (ir4 = it)) THEN
    IF (nt MOD 1000) <> 0 THEN GOTO Solo
ELSE
    nc4 = nc4 + 1                 'Tally Loop 4 codeword errors
END IF
' Display if next 1000 chip epoch or if Loop 4 codeword error occurs
CLS
PRINT ne0, ne1, ne2, nc1, nc4, nt
' Results for each of codeword's four symbols on its own plot
' Each plot has six components:
' (1) A large white cross shows original transmited dibit
' (2 & (3)) A medium red (green) cross shows loop1(4) decoded dibit
' (3) A medium red cross shows loop1 result after decoding
a1 = 50: sc = 70 * a1 / 100       'Coord axis length and display scale
y0 = 170 * a1 / 100               '
FOR j = 1 TO 4
    x0 = 320 + (a1 + 10) * (2 * j - 5)  'Horiz center for this symbol
    LINE (x0, y0 - a1) - (x0, y0 + a1), 8   'Form coord axes - one/sym
    LINE (x0 - a1, y0) - (x0 + a1, y0), 8
    dsx = sc * sx(j)                      'Show signal points
    dsy = sc * sy(j)                      ' as white crosses
    LINE (x0 + dsx + 5, y0 - dsy) - (x0 + dsx - 5, y0 - dsy), 15
    LINE (x0 + dsx, y0 - dsy - 5) - (x0 + dsx, y0 - dsy + 5), 15
    dsx = sc * sr1 * cp(ir1, j)           'Show decoded results for
    dsy = sc * sr1 * cq(ir1, j)           ' Case 1 as red crosses
    LINE (x0 + dsx + 4, y0 - dsy) - (x0 + dsx - 4, y0 - dsy), 12
    LINE (x0 + dsx, y0 - dsy - 4) - (x0 + dsx, y0 - dsy + 4), 12
    dsx = sc * sr4 * cp(ir4, j)           'Show decoded results for
    dsy = sc * sr4 * cq(ir4, j)           ' Case 4 as green crosses
    LINE (x0 + dsx + 3, y0 - dsy) - (x0 + dsx - 3, y0 - dsy), 10
    LINE (x0 + dsx, y0 - dsy - 3) - (x0 + dsx, y0 - dsy + 3), 10
    dsp! = sc * p!(j)                     'Show observables p,q
    dsq! = sc * q!(j)                     ' as blue crosses
    LINE (x0 + dsp! + 3, y0 - dsq!) - (x0 + dsp! - 3, y0 - dsq!), 9
    LINE (x0 + dsp!, y0 - dsq! - 3) - (x0 + dsp!, y0 - dsq! + 3), 9
    dx1! = sc * x1! (j)                   'Show observables x1,y1
    dy1! = sc * y1!(j)                    ' as red crosses
    LINE (x0 + dx1! + 3, y0 - dy1! + 3) - (x0 + dx1! - 3, y0 -
```

APPENDIX-continued

Each line of the code listing in the Appendix contains the control simulation information for providing a comparison of the performance of the basic decision directed phase locked loop (DD-PLL) for phase tracking of an input QPSK modulated signal based on a symbol by symbol basis and the improved decision directed phase locked loop (DD-PLL) for phase tracking of an input QPSK modulated signal based on (8, 4) biorthogonal code vector according to the principles of the present invention.

```
        dy1! − 3), 12
        LINE (x0 + dx1! + 3, y0 − dy1! − 3) − (x0 + dx1! − 3, y0 −
          dy1! + 3), 12
        dx4! = sc * x4!(j)                    'Show observables x4,y4
        dy4! = sc * y4!(j)                    ' as green crosses
        LINE (x0 + dx4! + 3, y0 − dy4! + 3) − (x0 + dx4! − 3, y0 −
          dy4! − 3), 10
        LINE (x0 + dx4! + 3, y0 − dy4! − 3) − (x0 + dx4! − 3, y0 −
          dy4! + 3), 10
NEXT j
FOR t = −100 TO 100                           'Display tracked phase
    LINE (100 + t, 450) − (100 + t, 450 − h1 (t))   ' histogram for Loop1
    LINE (540 + t, 450) − (540 + t, 450 − h4(t))    and Loop4
NEXT t
t = 400 * the1!(4) / pi!                      'Show current phase in
LINE (100 + t, 450) − (100 + t, 450 − h1(t)), 12  ' red for Loop1
t = 400 * the4! / pi!                         'Show current phase in
LINE (540 + t, 450) − (540 + t, 450 − h4(t)), 10  ' green for Loop4
WHILE INKEY$ = "": WEND
IF nt < 10000 THEN GOTO Solo
'Upon completion of simulation compute standard deviation of phase
' tracking error from the histograms
ht = 0
FOR t = −100 TO 100
    ht = ht + h1(t)                           Total event count
    m1! = m1! + t * h1(t)                     'First moment
    m2! = m2! + (t ^ 2) * h1(t)               'Second moment
NEXT t
m1! = m1! / ht
m2! = m2! / ht
v! = m2! − m1! ^ 2                            'Variance
d1! = SQR(v!) * pi! / 400                     'Deviation, Loop1, radians
ht = 0
FOR t = −100 TO 100
    ht = ht + h4(t)
    m1! = m1! + t * h4(t)
    m2! = m2! 4 (t ^ 2) * h4(t)
NEXT t
m1! = m1! / ht
m2! = m2! / ht
v! = m2! − m1! ^ 2
d4! = SQR(v!) * pi! / 400                     'Deviation Loop4, radians
PRINT d1! * 180 / pi!, d4! * 180 / pi!   'Print deviation in arcdeg
END
```

What is claimed is:

1. A decision directed phase locked loop (DD-PLL) for use in a data communication system, comprising:
   a first converter which converts a baseband quadrature pair of an input modulated signal encoded by a sequence of codewords from a rectangular form into a pair of polar coordinates having an incoming phase;
   a comparator which generates a phase difference of said incoming phase of said input modulated signal and an estimated phase;
   a second converter which converts said polar coordinates having said phase difference into a set of vector pairs of phase stabilized observables in said rectangular form;
   a decoder which decodes said set of vector pairs of phase stabilized observables in said rectangular form at a decode rate to generate decoded data;
   a vector error evaluator which evaluates said set of vector pairs of phase stabilized observables in accordance with said decoded data at each codeword to generate a decision directed phase error estimate; and
   a loop filter which filters said decision directed phase error estimate to yield an update of said estimated phase at each codeword.

2. A decision directed phase locked loop as claimed in claim 1, wherein said input modulated signal corresponds to one of a binary phase shift keying (BPSK) modulated signal and a quaternary phase shift keying (QPSK) modulated signal.

3. A decision directed phase locked loop as claimed in claim 2, wherein said codewords correspond to biorthogonal binary codes.

4. A decision directed phase locked loop as claimed in claim 3, wherein each of said codewords contains four data symbols, and said decode rate for decoding said set of vector pairs of phase stabilized observables corresponds to one quarter of a symbol rate.

5. A decision directed phase locked loop as claimed in claim 4, wherein said vector error evaluator comprises:
   a buffer which retains said set of vector pairs of phase stabilized observables during each codeword;
   a derotator which translates each decoded codeword from said decoded data into constituent dibits and derotates said set of vector pairs of phase stabilized observables corresponding to each dibit using a reverse angle for each dibit to yield derotated variables;
   an accumulator which accumulates said derotated variables for integration over four symbols to yield integrated variables; and
   an arctangent unit which determines an arctangent of said integrated variables to yield said decision directed phase error estimate.

6. A decision directed phase locked loop as claimed in claim 5, wherein said arctangent unit first obtains an angle estimate from said integrated variables, a mean value of said angle estimate, and then subtracts said mean value of said angle estimate from said angle estimate to yield said decision directed phase error estimate.

7. A decision directed phase locked loop as claimed in claim 6, wherein said estimated phase is updated at one quarter the symbol rate.

8. A decision directed phase locked loop as claimed in claim 6, wherein said estimated phase is updated every codeword of four data symbols.

9. A decision directed phase locked loop as claimed in claim 1, wherein said comparator includes a subtractor for subtracting said incoming phase of said input modulated signal from said estimated phase to generate said phase difference.

10. A communication receiver using a decision directed phase locked loop (DD-PLL) for receiving an input modulated signal from a transmission channel, comprising:
   means for generating a succession of baseband signal samples of said input modulated signal including an in-phase component and a quadrature-phase component;
   a first translator which translates said baseband signal samples into polar coordinates having an incoming phase of said input modulated signal;
   a comparator which generates a phase difference of said incoming phase of said input modulated signal and an estimated phase;
   a second translator which translates said polar coordinates having said phase difference into phase stabilized observables;
   a decoder which decodes said phase stabilized observables at a decode rate to generate decoded data;

a vector error evaluator which evaluates said phase stabilized observables based on said decoded data at each codeword to generate a decision directed phase error estimate; and a digital filter which filters said decision directed phase error estimate to yield an update of said estimated phase.

11. A communication receiver as claimed in claim 10, wherein said input modulated signal corresponds to one of a binary phase shift keying modulated signal and a quaternary phase shift keying modulated signal.

12. A communication receiver as claimed in claim 10, wherein said codewords correspond to biorthogonal binary codes.

13. A communication receiver as claimed in claim 11, wherein each of said codewords contains four data symbols, and said decode rate for decoding said phase stabilized observables corresponds to one quarter of a symbol rate.

14. A communication receiver as claimed in claim 11, wherein said vector error evaluator comprises:

a buffer which retains said phase stabilized observables during each codeword;

a derotator which translates each decoded codeword from said decoded data into constituent dibits and derotates said phase stabilized observables corresponding to each dibit using a reverse angle for each dibit to yield derotated variables;

an accumulator which accumulates said derotated variables for integration over four symbols to yield integrated variables; and an arctangent unit which determines an arctangent of said integrated variables to yield said decision directed phase error estimate.

15. A communication receiver as claimed in claim 14, wherein said arctangent unit first obtains an angle estimate from said integrated variables, a mean value of said angle estimate, and then subtracts said mean value of said angle estimate from said angle estimate to yield said decision directed phase error estimate.

16. A communication receiver as claimed in claim 15, wherein said estimated phase is updated at one quarter the symbol rate.

17. A communication receiver as claimed in claim 15, wherein said estimated phase is updated every codeword of four data symbols.

18. A communication receiver as claimed in claim 10, wherein said comparator includes a subtractor for subtracting said incoming phase of said input modulated signal from said estimated phase to generate said phase difference.

19. A communication receiver as claimed in claim 10, wherein said means for generating said succession of baseband signal samples comprises:

a down converter which down converts said input modulated signal into an intermediate frequency signal;

a synchronous demodulator which demodulates said intermediate frequency signal from a baseband quadrature pair into a sequence of complex sample pairs; and a matched filter and sampler which passes said sequence of complex sample pairs and samples at a symbol rate to produce said succession of baseband signal samples.

20. A method of tracking an incoming phase of an input modulated signal using a decision directed phase locked loop (DD-PLL), comprising the steps of:

receiving a baseband quadrature pair of an input modulated signal encoded by a sequence of codewords;

translating said baseband quadrature pair of said input modulated signal from a rectangular form into a pair of polar coordinates having an incoming phase;

generating a phase difference of said incoming phase of said input modulated signal and an estimated phase;

translating said polar coordinates having said phase difference into a set of vector pairs of phase stabilized observables in said rectangular form;

decoding said set of vector pairs of phase stabilized observables in said rectangular form at a decode rate to generate decoded data;

evaluating said set of vector pairs of phase stabilized observables in accordance with said decoded data at each codeword to generate a decision directed phase error estimate; and filtering said decision directed phase error estimate to yield an update of said estimated phase.

21. A method as claimed in claim 20, wherein said input modulated signal corresponds to one of a binary phase shift keying (BPSK) modulated signal and a quaternary phase shift keying (QPSK) modulated signal.

22. A method as claimed in claim 20, wherein said codewords correspond to biorthogonal binary codes.

23. A method as claimed in claim 22, wherein each of said codewords contains four data symbols, and said decode rate for decoding said set of vector pairs of phase stabilized observables corresponds to one quarter of a symbol rate.

24. A method as claimed in claim 23, wherein said set of vector pairs of phase stabilized observables is evaluated by a series of substeps of:

retaining said set of vector pairs of phase stabilized observables during each codeword;

translating each decoded codeword from said decoded data into constituent dibits and derotating said set of vector pairs of phase stabilized observables corresponding to each dibit using a reverse angle for each dibit to yield derotated variables;

accumulating said derotated variables for integration over four symbols to yield integrated variables; and determining an arctangent of said integrated variables to yield said decision directed phase error estimate.

25. A method as claimed in claim 24, wherein said decision directed phase error estimate is yielded by first obtaining an angle estimate from said integrated variables, a mean value of said angle estimate, and then subtracting said mean value of said angle estimate from said angle estimate.

26. A method as claimed in claim 25, wherein said estimated phase is updated at one quarter the symbol rate.

27. A method as claimed in claim 25, wherein said estimated phase is updated every codeword of four data symbols.

28. A communication receiver for receiving an input modulated signal encoded by a sequence of codewords, comprising:

a converter which converts the input modulated signal encoded by said sequence of codewords into a series of phase stabilized observables in rectangular form for each codeword; and a decoder for decoding said phase stabilized observables at a decode rate to generate decoded data;

an error estimator which estimates a phase error of the input modulated signal by derotation of the series of phase stabilized observables based on said decoded data and updates said phase error at each codeword.

29. A communication receiver as claimed in claim 28, wherein said input modulated signal corresponds to one of a binary phase shift keying modulated signal and a quaternary phase shift keying modulated signal, wherein said codewords correspond to biorthogonal binary block codes, and wherein each of said codewords contains at least four data symbols, and said decode rate for decoding said phase stabilized observables corresponds to one quarter of a symbol rate.

30. A communication receiver as claimed in claim 29, wherein said error estimator comprises:

a buffer which retains said phase stabilized observables during each codeword;

a derotator which translates each decoded codeword from said decoded data into constituent dibits and derotates said phase stabilized observables corresponding to each dibit using a reverse angle for each dibit to yield derotated variables;

an accumulator which accumulates said derotated variables for integration over four symbols to yield integrated variables;

an arctangent unit which determines an arctangent of said integrated variables to yield said phase error; and a digital filter which filters said decision directed phase error estimate to yield an update of said phase error.

31. A communication receiver as claimed in claim 30, wherein said arctangent unit first obtains an angle estimate from said integrated variables, next obtains a mean value of said angle estimate, and then subtracts said mean value of said angle estimate from said angle estimate to yield said phase error.

32. A communication receiver as claimed in claim 31, wherein said phase error is updated at every codeword of four data symbols.

* * * * *